United States Patent Office.

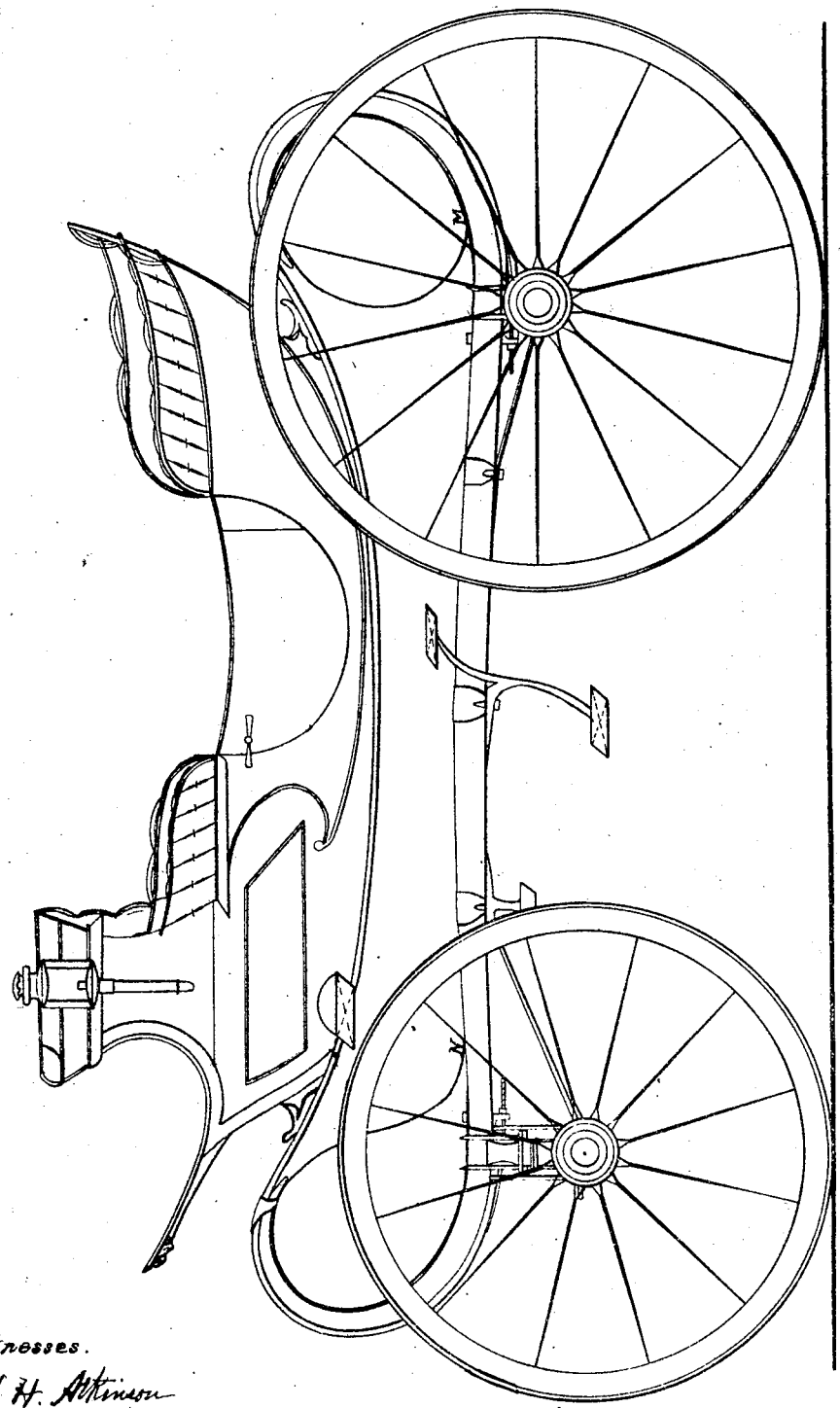

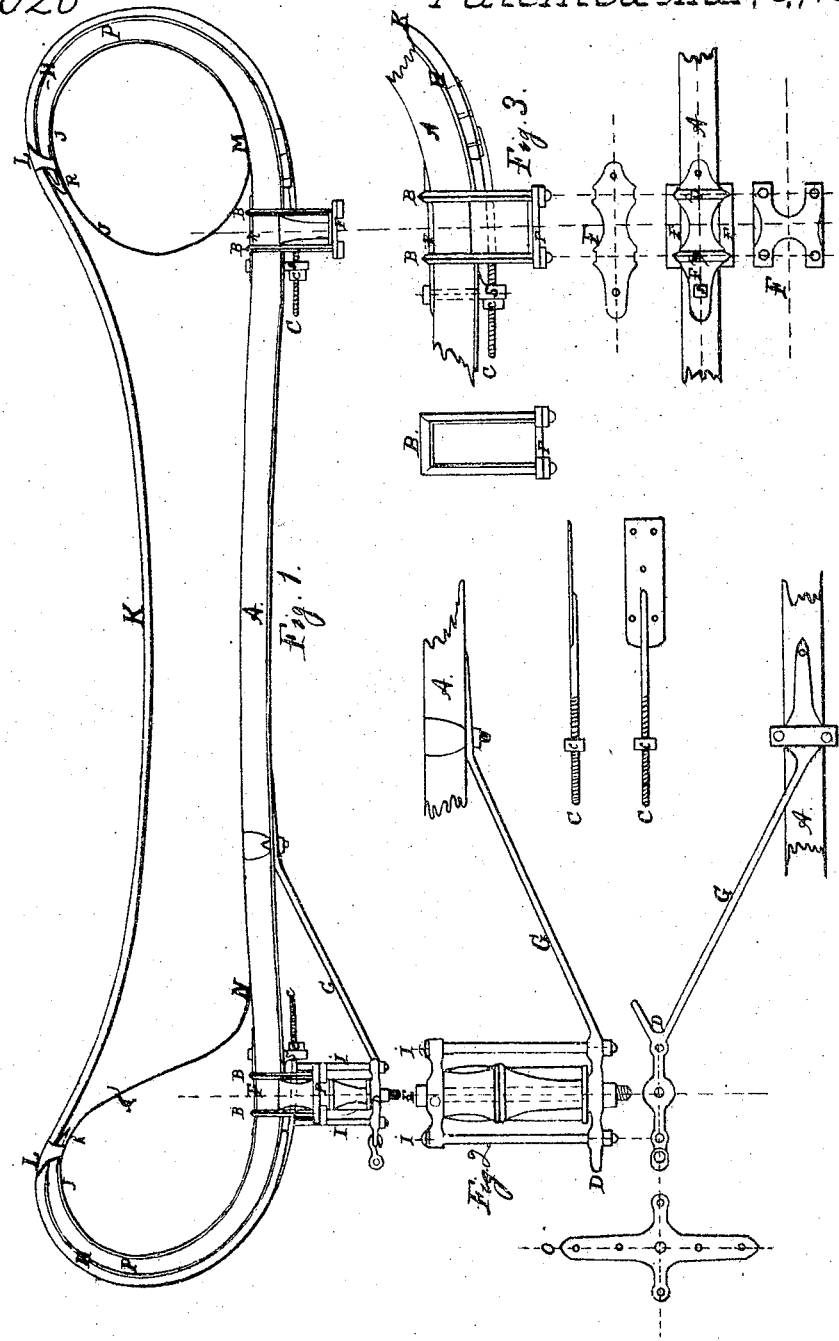

GEORGE P. KIMBALL, OF SAN FRANCISCO, CALIFORNIA.

*Letters Patent No. 75,026, dated March 3, 1868.*

IMPROVEMENT IN THE CONSTRUCTION OF VEHICLES.

The Schedule referred to in these Letters Patent and making part of the same.

TO WHOM THESE PRESENTS SHALL COME:

Be it known that I, GEORGE P. KIMBALL, of the city and county of San Francisco, State of California, have made a new and useful Improvement in the Arrangement and Construction of Vehicles; and I do declare the following description, taken together with the accompanying drawings, to be a full and exact description of the same, and will enable any one skilled in the art to manufacture the same.

The purposes of my invention are to make wagons suitable for all purposes of travel, from light buggies to heavy wagons, coaches, or other vehicles, in a lighter, cheaper, and more durable manner than has been heretofore manufactured, and is principally intended for stages and wagons used in travelling over mountainous roads.

The nature of my invention consists in arranging the perch A and jack P, combined with the metallic bars J J and H H, and the peculiar attachments connecting the same to the axle and head-block; also, the novel arrangement of the screw C and nut C, attaching to the thorough-brace. It also relates to the arrangement of the cross-plate O, on the top of the head-block, and the bar D, underneath the axle, in combination with the bolts I I, to provide against accident by accidental breakage of the king-bolt E. To better describe my invention, reference is made to—

Figure 1 showing the perch A, jack P, bars J J and H H, screws and nuts C C, brace G, and clips B B B B, attaching the perch and jack to the axle.

Figure 2 represents the bolts I I, as combined with the bar D and plate O.

Figure 3 represents the plates F F and clips B B B B, attaching the parts together.

The perch A and jack P are made rigid or firm by means of the metallic bars H H and J J. By this novel combination the heavy jacks, for attaching the thorough-brace to inhanging post-coaches, are dispensed with; also the centre-perch and heavy head-blocks and braces used in the old style; also, the body of common thorough-brace wagons are put directly on the thorough-brace, dispensing with the heavy and expensive rockers, plates, and braces, and also adds ease of carriage and durability, and greatly reduces the cost from the old style. On the out and inside of the jack P the metallic bars J J and H H are placed, to combine with and strengthen the wood of the jack. The bars J J may attach to the jack, by any well-known means, at the points N and N, or between them, or, in light carriages, the part from M and N to R R may be dispensed with. The bars J J and H H are combined with the wood by any well-known means. The perch and jack are attached to the top of the axle and head-block by the clips B B B B, clamping on the plate F, on the top of the perch, and combining with the clip-bar plate F underneath. The diagonal braces diverge from the bar D and combine with the perch A to steady the same and hold the axle to place. For the purpose of taking up the thorough-brace the screw C and nut C are attached to it, acting in combination with the bolts S S.

Having thus described my improvements, I claim—

1. The combination of the perch A and jack P with bars J J and H H, substantially as described and for the purposes set forth.

2. The combination of the bar D, plate O, bolts I I, braces G, and perch A, substantially as described and for the purposes set forth.

3. The combination of the screw-plate C and nut C with eye-bolt S, substantially as described and for the purposes set forth.

Signed, February 6, 1868.

GEO. P. KIMBALL.

Witnesses:
J. H. ATKINSON,
BENJAMIN T. WRIGHT.